United States Patent [19]

Wingrove

[11] Patent Number: 4,743,656
[45] Date of Patent: May 10, 1988

[54] ELASTOMERIC COMPOSITION OF EPDM AND ETHYLENE-NITRILE POLYMERS

[75] Inventor: Donald E. Wingrove, Cheshire, Conn.

[73] Assignee: Uniroyal Chemical Company, Inc., Middlebury, Conn.

[21] Appl. No.: 808,208

[22] Filed: Dec. 12, 1985

Related U.S. Application Data

[63] Continuation-in-part of Ser. No. 703,290, Feb. 20, 1985, which is a continuation-in-part of Ser. No. 624,160, Jun. 25, 1984, abandoned.

[51] Int. Cl.$^4$ ................................................ C08L 9/02
[52] U.S. Cl. .................................... 525/211; 526/233
[58] Field of Search ............... 525/211, 232, 236, 233, 525/237, 345, 354

[56] References Cited

U.S. PATENT DOCUMENTS 4,202,801  5/1980  Peterson .............................. 525/232

Primary Examiner—Christopher Henderson
Attorney, Agent, or Firm—William E. Dickheiser

[57] ABSTRACT

Elastomeric compositions produced by curing a blend of (A) ethylene/alphaolefin/nonconjugated polyene terpolymer; and (B) acrylonitrile/conjugated diene copolymer, utilizing a curing agent comprising sulfur, a sulfur cure accelerator and a peroxide curative exhibit desirable properties. Also disclosed is a process for preparing such elastomers.

18 Claims, No Drawings

ELASTOMERIC COMPOSITION OF EPDM AND ETHYLENE-NITRILE POLYMERS

This application is a continuation-in-part of U.S. patent application No. 703,290, filed Feb. 20, 1985, which is a continuation-in-part of U.S. patent application No. 624,160, filed June 25, 1984, and now abandoned.

FIELD OF THE INVENTION

This invention relates to an elastomeric composition produced by curing a blend of (A) ethylene/alphaolefin/nonconjugated polyene terpolymer, and (B) acrylonitrile/conjugated diene copolymer; utilizing a curing agent comprising (i) sulfur, (ii) a sulfur cure accelerator, and (iii) a (hydro)peroxide curative. In another aspect, this invention relates to a process for producing such an elastomeric composition.

BACKGROUND OF THE INVENTION

There is a great need in industry for elastomers which exhibit desirable resistance to oil, ozone and heat. In many applications, this need is fulfilled by the use of neoprene rubber (i.e., polychloroprene).

However, while neoprene will provide the desirable ozone, heat, and oil resistance required for many applications (such as for front wheel drive boots) it would nevertheless be desirable to possess an elastomeric composition which would provide the heat, ozone and oil resistance of neoprene, and yet which would additionally exhibit improved resistance to cut growth and resistance to flex fatigue.

Accordingly, it is an object of this invention to provide an elastomeric composition which exhibits heat, ozone and oil resistance comparable to that exhibited by neoprene, and which additionally exhibits improved resistance to cut growth and resistance to flex fatigue.

It is a further object of this invention to provide a process for producing such an elastomeric composition.

The above and additional objects will become more fully apparent from the following description and accompanying Examples.

DESCRIPTION OF THE INVENTION

In one aspect, this invention relates to an elastomeric composition produced by curing a blend comprising:
(A) ethylene/alphaolefin/nonconjugated polyene terpolymer; and
(B) acrylonitrile/conjugated diene copolymer;
employing an effective amount of a curing agent comprising:
 (i) sulfur
 (ii) a sulfur cure accelerator; and
 (iii) a peroxide curative.

In another aspect, this invention is directed to a process for producing an elastomeric composition, which process comprises the steps of:
(I) preparing a blend comprising:
 (A) ethylene/alphaolefin/nonconjugated polyene terpolymer;
 (B) acrylonitrile/conjugated diene copolymer; and
 (C) an effective amount of a curing agent comprising:
  (i) sulfur;
  (ii) a sulfur cure accelerator; and
  (iii) a peroxide curative; and
(II) subjecting said blend to curing conditions.

As is employed in the Specification and claims herein, the term "peroxide" includes hydroperoxide curatives as well as peroxide curatives.

The compositions of this invention are formed by curing blends of (A) ethylene/alphaolefin/nonconjugated polyene terpolymer and (B) acrylonitrile/conjugated diene copolymer.

The ethylene/alphaolefin/nonconjugated polyene terpolymers, i.e., Component (A), which may be employed are polymers of ethylene, at least one alphaolefin (of the formula $H_2C=CHR$, wherein R is a linear or branched alkyl radical comprised of from 1 to 10 carbon atoms) and at least one copolymerizable nonconjugated polyene. Preferably, in the formula above, R is a $C_1-C_8$ alkyl radical. The most preferred alphaolefins are propylene, 1-butene and 1-pentene.

Illustrative of the nonconjugated polyenes which may be employed are aliphatic dienes such as 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, exo- and endo-dicyclopentadiene and the like; exo- and endo-alkenylnorbornenes, such as 5-propenyl-, 5-(buten-2-yl)-, and 5-(2-methylbuten-[2']-yl)norbornene and the like; alkylalkenylnorbornenes, such as 5-methyl-6-propenylnorbornene and the like; alkylidenenorbornenes, such as 5-methylene-, 5-ethylidene-, and 5-isopropylidene-2-norbornene, vinylnorbornene, cyclohexenylnorbornene and the like; alkylnorbornadienes, such as methyl-, ethyl-, and propylnorbornadiene and the like; and cyclodienes such as 1,5-cyclooctadiene, 1,4-cyclooctadiene and the like. The preferred nonconjugated polyenes are 5-ethylidene-2-norbornene, 1,4-hexadiene and dicyclopentadiene.

The ethylene to alphaolefin weight ratio of the ethylene/alphaolefin/nonconjugated polyene terpolymers which may be employed in the present invention is generally between about 25:75 and about 85:15, is preferably between about 40:60 and about 80:20, and is most preferably between about 60:40 and about 80:20. The polyene content of such terpolymers is generally below about 25%, and is preferably between about 1 and about 15% by weight.

Moreover, the terpolymers employed in the composition of this invention may have incorporated therein and/or at the terminals thereof functional groups such as halogen, sulfo, sulfino, sulfinyl, cyano, epoxy, hydroxy, carboxy, COOR, $Si(OR^2)_3$, $Si(OOCR^2)_3$ ($R^2$ being a hydrocarbyl radical having 1-18 carbon atoms) and the like. Such functional groups may be introduced either by replacement, addition or graft polymerization reactions well known to those skilled in the art of polymerization.

The acrylonitrile/conjugated diene copolymers, i.e., Component (B), which may be employed in the process of this invention are elastomers composed of acrylonitrile and a conjugated diene, preferably a 1,3-butadiene. Although substituted dienes, such as 2-methyl-1,3-butadiene, 2,3-dimethyl-1,3-butadiene and the like, or other conjugated dienes, such as 1,3-pentadiene and the like, may be employed, the preferred comonomer is 1,3-butadiene. In general, such copolymers will comprise between about 10 and about 50, preferably between about 18 and about 45, and most preferably between 20 and about 40 weight percent acrylonitrile, with the conjugated diene typically comprising the remainder (up to 100 percent). The acrylonitrile/conjugated diene copolymer, Component (B), may optionally be blended with another polymer, such as polyvinyl chloride, if desired, prior to blending with Component (A).

The ethylene/alphaolefin/nonconjugated polyene terpolymers and acrylonitrile/conjugated diene copolymers employed may be high molecular weight solid or low molecular weight liquids, depending upon the cured properties desired. The preferred molecular weights for a given application may be readily determined by one skilled in the art by routine experimentation.

The curing composition of this invention comprises sulfur, at least one sulfur cure accelerator and at least one peroxide curative.

The sulfur cure accelerators which may be employed include thioureas, such as N,N'-dibutylthiourea, 2-mercaptoimidazoline, tetramethylthiourea and the like; guanidine derivatives, such as N,N'-diphenylguanidine and the like; xanthates, such as zinc dibutylxanthate and the like; dithiocarbamates, such as zinc dimethyldithiocarbamate, zinc diethyldithiocarbamate, zinc dibutyldithiocarbamate, zinc diethyldithiocarbamate, zinc dibutyldithiocarbamate, sodium diethyldithiocarbamate, and the like; thiuramsulfides, such as dipentamethylenethiuram disulfide, dipentamethylenethiuram hexasulfide, tetrabutylthiuram monosulfide, tetramethylthiuram monosulfide, tetraethylthiuram monosulfide, tetraethylthiuram disulfide and the like; heterocyclics, such as mercaptobenzimidazole, mercaptobenzthiazole, 2,2'-dibenzothiazyl disulfide, zinc 2-mercaptobenzothiazole and the like; and sulfenamides, such as N-oxydiethylene-2-benzothiazolesulfenamide, N-t-butylbenzothiazylsulfenamide, N-cyclohexyl-2-benzothiazylsulfenamide, N,N-diisopropyl-2-benzothiazylsulfenamide and the like. Moreover, mixtures of two or more sulfur cure accelerators may be employed in the curing agent of this invention. The preferred accelerators are thiazoles and sulfenamides, with sulfenamides being particularly preferred.

Illustrative of the peroxides which may be employed are benzoyl peroxide, 1,3-bis(t-butylperoxyisopropyl)benzene, butyl 4,4-bis(t-butylperoxy)valerate, p-chlorobenzoyl peroxide, cumene hydroperoxide, t-butyl cuyml peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and the like. Mixtures of two or more peroxide may also be employed. The preferred peroxides are dicumyl peroxide and 2,5-dimethyl-2,5-di-t-butylperoxyhexane.

Typically, between about 0.5 and about 200, preferably between about 5 and about 150, and most preferably between about 6 and about 14, gram atoms of sulfur per mole of peroxide are present in said curing agent.

The sulfur cure accelerator is generally present in amounts of between about 0.1 gram and about 5 grams per 100 grams of rubber, with preferably between about 0.3 gram and about 3.0 grams of accelerator per 100 grams of rubber being present. Most preferably, between about 0.3 gram and about 1.0 gram of accelerator per 100 grams of rubber are employed.

Generally, between about 0.2 and about 5, preferably between about 0.5 and about 3, and more preferably between about 0.5 and about 1.5 grams of sulfur per hundred grams of rubber are employed. Employing the ratios of sulfur to peroxide stated above, one skilled in the art can easily calculate the corresponding amount of the particular peroxide which is to be employed.

The weight ratio of ethylene/alphaolefin/nonconjugated polyene terpolymer to acrylonitrile/conjugatd diene copolymer will generally vary between about 10:90 and about 90:10. Ratios of between about 30:70 and about 50:50 are preferred for most applications, although, as will be recognized by one skilled in the art, the preferred ratio will vary with the particular use to which the product is to be applied.

In addition to the ethylene/alphaolefin/nonconjugated polyene terpolymer, the acrylonitrile/conjugated diene copolymer and the three-component curing agent described above, the blends of this invention may further comprise zinc oxide, reinforcing agents, fillers, processing aids, extender oils, plasticizers, antidegradients, and the like, all of which additional components are well known to those skilled in the rubber art.

Preferably, between about 2 and about 10 grams of zinc oxide per hundred grams of rubber are employed, although amounts in excess of 10 grams may also be employed. Most preferably, between about 3 and about 5 grams of zinc oxide per 100 grams of rubber are present.

The blend of this invention is typically prepared by first mixing all the ingredients except the curing agent in a suitable mixing device (such as a Banbury [trademark] type internal mixer, a two roll mill, or the like). Such mixing will typically require about 5 minutes, although shorter or longer mixing periods may be employed. This mixing may be performed at temperatures ranging from room temperature or cooler up to about 150° C. or higher. If mixing temperatures above the activation temperature of the curing agent are employed, upon completion of the mixing the blended rubber is cooled or allowed to cool to temperature below such activation temperature. The curing agent is then incorporated into the blend by subsequent mixing or milling.

Alternatively, the blend of this invention may be prepared by formulating a terpolymer component and a copolymer component and blending desired amounts of the two components together. In this alternative embodiment, the location of the elements of the curing agent (i.e. the peroxide, sulfur and sulfur cure accelerator) is not critical, with any or all such elements being blended in either component or both.

Vulcanization of the blend may be carried out in a press, an oven or other suitable means until crosslinking has occured to a satisfactory state of cure.

EXAMPLES

The following Examples are intended to further illustrate the invention and are not intended to limit the scope of the invention in any manner.

EXAMPLES 1 and 2 and COMPARATIVE EXPERIMENTS A and B

Employing the ingredients indicated in Table I, (which are listed in parts per hundred of rubber by weight) several rubber compositions were produced as follows.

A total of 100 parts by weight of rubber, comprising 60 parts by weight of nitrile rubber (composed of 32.5 weight percent acrylonitrile and 67.5 weight percent butadiene) and 40 parts by weight of ethylene/propylene/5-ethylidene-2-norbornene (E/P ratio equal to 72:28 by weight; ENB=8 weight percent) along with zinc oxide and an antioxidant in the amounts listed in Table I below. After 2 minutes, 45 parts of carbon black (N550) along with 1 part stearic acid, 2 parts Sunproof, Jr. (a blend of selected waxes, mp=63°-66° C.) and 20 parts plasticizer (dioctyl phthalate) were introduced into the mixer. After mixing had been continued for another 2 minutes, the inside of the mixer was swept, and blending was continued for one more minute. The blend was then removed from the mixer and cooled.

On a mill, the curing agent, comprising 0.75 part sulfur, 3.5 parts 40 weight percent active dicumylperoxide on clay (Dicup 40 KE), and 0.75 parts sulfur cure accelerator, N-cyclohexyl-2-benzothiazole sulfenamide (Delac S) was added to the mixture. The compounded stock so formed was sheeted out and samples were cut.

The samples (Example 1) were cured at 171° C. for 10 minutes, and the physical properties of such samples determined. The dynamic properties were tested in accordance with ASTM D-412, while the other properties were tested as labeled in Table II. The results of such testing are listed in Table II below.

Example 2 was prepared following a process essentially identical to that described for Example 1, except that 65 parts of N762 carbon black and 15 parts of di-ether-ester plasticizer (Plasthall 7041) were employed.

Comparative Example A was prepared following a procedure essentially identical to that employed in Example 1, except that a curing system comprised of sulfur, a sulfur cure accelerator (Delac S) and long chain accelerators (an equal measure of N,N'-dioctadecyl-N,N'-diisopropyl thiuram disulfide and the zinc salt of N,N'-dioctadecyl-N,N'-diisopropyl thiuram disulfide), which cure system is disclosed in U.S. Pat. No. 3,678,135, was employed.

In comparative Experiment B, a typically formulated neoprene was prepared comprising the components listed in Table I.

Samples of Example 2 and Comparative Experiments B and C were prepared and tested, the results of such testing being summarized in Table II below.

TABLE I

| Example or Comparative Experiment | 1 | 2 | A | B |
|---|---|---|---|---|
| Nitrile Rubber | 60 | 60 | 60 | — |
| EPDM | 40 | 40 | 40 | — |
| Neoprene GRT | — | — | — | 100 |
| Zinc Oxide | 5.0 | 5.0 | 5.0 | 5.0 |
| Carbon Black[1] | 45.0 | 65.0 | 45.0 | 60.0 |
| Stearic Acid | 1.0 | 1.0 | 1.0 | 1.0 |
| Sunproof, Jr. (Wax, MP = 65-70° C.) | 2.0 | 2.0 | 2.0 | 2.0 |
| Extender Oil[2] | 20.0 | 20.0 | 15.0 | 10.0 |
| Antioxidant[3] | 1.0 | 1.0 | 1.0 | 2.0 |
| Magnesium Oxide | — | — | — | 4.0 |
| END-75[4] | — | — | — | 0.2 |
| Sulfur | 0.75 | 0.75 | 1.0 | — |
| Dicumyl Peroxide (40% active) | 3.5 | 3.5 | — | — |
| Sulfur Cure Accelerator | 0.75 | 0.75 | 1.0 | — |
| Long Chain Accelerator | — | — | 2.0 | — |

[1]N550 black in Example 1 and Comparative Experiment A; N762 black in Example 2; N990 black in Comparative Experiment B.
[2]Dioctylphthalate in Example 1 and Comparative Experiment A; Plasthall 7041 in Example 2; Sunthane 4240 in Comparative Experiment B.
[3]Flexzone 6H in Examples 1 and 2 and Comparative Experiment A; Wingstay 100 in Comparative Experiment B.
[4]Neoprene accelerator available from Wyrough and Loser.

TABLE II

| Example or Comparative Experiment | 1 | 2 | A | B |
|---|---|---|---|---|
| Nitrile Rubber | 60 | 60 | 60 | — |
| EPDM | 40 | 40 | 40 | — |
| Neoprene | — | — | — | 100 |
| Long Chain Accelerator | No | No | Yes | No |
| Sulfur/Accelerator/Peroxide Cure System | Yes | Yes | No | No |
| Mooney Scorch @ 275° F. | 16.5 | 14.0 | 8.0 | 6.0 |
| CURED 10 MINUTES @ 171° C. | | | | |
| Tensile Strength, psi | 2170 | 2070 | 2130 | 2300 |
| Elongation, % | 610 | 500 | 580 | 760 |
| 300% Modulus, psi | 970 | 1190 | 980 | 1010 |
| Die C Tear, ppi | 240 | 230 | 271 | 293 |
| Hardness, Shore A | 63 | 65 | 62 | 60 |
| AGED 70 HOURS @ 100° C. | | | | |
| Tensile strength, psi | 2880 | 2300 | 2280 | 2060 |
| Elongation, % | 520 | 400 | 450 | 510 |
| 300% Modulus, psi | 1460 | 1710 | 1510 | 1530 |
| Die C Tear, ppi | 260 | 235 | 250 | 250 |
| Hardness, Shore A | 67 | 72 | 67 | 66 |
| MONSANTO FATIGUE TO FAILURE CAM 24 UNAGED SAMPLES | | | | |
| Kilocycle To Failure | 467 | 244 | 257 | 34 |
| AGED 70 HOURS @ 100° C. IN ASTM #3* Oil | | | | |
| Tensile Strength, psi | 1020 | 870 | 930 | 1390 |
| Elongation, % | 310 | 230 | 310 | 500 |
| Hardness, Shore A | 33 | 34 | 35 | 32 |
| Volume Change, % | +86 | +91 | +81 | +70 |
| *ASTM D-471 | | | | |
| DEMATTIA FLEX (ASTM D-430) | | | | |
| Unknicked, Kilocycles to Failure | ** | ** | ** | 900 |
| Knicked, Kilocycles to Failure | ** | 619 | 325 | 30 |
| **No failure after 1500 Kilocycles | | | | |
| OZONE RESISTANCE 50 pphm at 38° C. | | | | |
| Bent Loop Hrs. to Failure (ASTM D-1149) | >1034 | >1034 | >1034 | >1034 |
| Dynamic 25% ext, Hrs. to Failure (ASTM D-3395 Method A) | *** | *** | 400 | 170 |

***No failure after 500 hours

The above data indicate that the compositions of this invention exhibit high heat resistance, ozone resistance and oil resistance comparable to neoprene coupled with enhanced resistance to cut growth and resistance to flex fatigue. Thus, the Monsanto fatigue to failure results indicate the grately increased resistance to flex fatigue of the composition of this invention relative to neoprene, with Examples 1 and 2 (this invention) showing fatigue after 467 and 244 hours respectively, while Comparative Experiment B (neoprene) failed after only 34 hours. Similarly, the Demattia flex data show that the compositions of this invention exhibit enhanced resistance to cut growth relative to the neoprene sample.

The above data also indicate that the compositions of this invention which have been cured employing a sulfur/sulfur accelerator/peroxide curing system exhibit greater dynamic properties than EPDM/nitrile rubber blends cured employing prior art curative systems. Thus, a comparison of Examples 1 and 2 with Comparative Experiment A show that the EPDM/nitrile rubber compositions produced in accordance with this invention exhibit enhanced Mooney Scorch, knicked Demattia flex and dynamic ozone values relative to identical blends cured employing prior art cure systems.

What is claimed is:
1. An elastomeric composition produced by curing a blend comprising:
 (A) ethylene/alphaolefin/nonconjugated polyene terpolymer: and
 (B) acrylonitrile/conjugated diene copolymer; wherein the weight ratio of component (A) to com- ponent (B) is between about 10.90 and about 90:10; employing a curing agent comprising:
  (i) between about 0.2 and about 5 grams of sulfur per 100 grams of Components (A) and (B);
  (ii) between about 0.1 and about 5 grams per 100 grams of Components (A) and (B) of a sulfur cure accelerator; and
  (iii) an amount of a peroxide curative such that between about 0.5 and about 200 gram atoms of sulfur per mole of peroxide are present.

2. The composition of claim 1 wherein component (A) is a ethylene/propylene/nonconjugated diene terpolymer; component (B) is an acrylonitrile/1,3-butadiene copolymer; the sulfur cure accelerator is a sulfenamide; and the peroxide curative comprises at least one member of the group consisting of dicumyl peroxide and 2,5-dimethyl-2,5-di-t-butylperoxyhexane.

3. The composition of claim 1 wherein the weight ratio of component (A) to component (B) is between about 30:70 and about 50:50.

4. The composition of claim 1 wherein component (A) is an ethylene/propylene/nonconjugated diene terpolymer.

5. The composition of claim 4 wherein said nonconjugated diene is selected from the group consisting of 1,4-hexadiene, 5-ethylidene-2-norbornene and dicyclopentadiene.

6. The composition of claim 1 wherein component (B) is an acrylonitrile/1,3-butadiene copolymer.

7. The composition of claim 1 wherein the sulfur cure accelerator is a thiazole or a sulfenamide.

8. The composition of claim 7 wherein the sulfur cure accelerator is a sulfenamide.

9. The composition of claim 1 wherein said peroxide curative is selected from the group consisting of dicumyl peroxide and 2,5-dimethyl-2,5-di-t-butylperoxyhexane.

10. A process for producing an elastomeric composition which process comprises the steps of:
(I) preparing a blend comprising:
  (A) ethylene/alphaolefin/nonconjugated polyene terpolymer;
  (B) acrylonitrile/conjugated diene copolymer; wherein the weight ratio of component (A) to component (B) is between about 10:90 and about 90:10; and
  (C) a curing agent comprising:
    (i) between about 0.2 and about 5 grams of sulfur;
    (ii) between about 0.1 and about 5 grams per 100 grams of components (A) and (B) of a sulfur cure accelerator; and
    (iii) an amount of a peroxide curative such that between about 0.5 and about 200 gram atom of sulfur per mole of peroxide is present;
(II) subjecting said blend to curing conditions.

11. The process of claim 10 wherein the weight ratio of component (A) to component (B) is between about 30:70 and about 50:50.

12. The process of claim 10 wherein component (A) is an ethylene/propylene/nonconjugated diene terpolymer.

13. The process of claim 12 wherein said nonconjugated diene is selected from the group consisting of 1,4-hexadiene, 5-ethylidene-2-norbornene and dicyclopentadiene.

14. The process of claim 10 wherein component (B) is an acrylonitrile/1,3-butadiene copolymer.

15. The process of claim 10 wherein the sulfur cure accelerator is a sulfenamide.

16. The process of claim 15 wherein the sulfur cure accelerator is a sulfenamide.

17. The process of claim 10 wherein said peroxide curative is selected from the group consisting of dicumyl peroxide and 2,5-dimethyl-2,5-di-t-butylperoxyhexane.

18. The process of claim 10 wherein component (A) is a ethylene/propylene/nonconjugated diene terpolymer; component (B) is an acrylonitrile/1,3-butadiene copolymer; the sulfur cure accelerator is a sulfenamide; and the peroxide curative comprises at least one member of the group consisting of dicumyl peroxide and 2,5-dimethyl-2,5-di-t-butylperoxyhexane.

* * * * *